June 19, 1962   J. D. BRYAN ET AL   3,039,204
OPTICAL SIMULATOR
Filed Dec. 2, 1959   3 Sheets-Sheet 1

INVENTORS
J. DAVID BRYAN
JOHN W. THOMPSON
BY
THOMAS J. HOLDEN
ATTORNEY

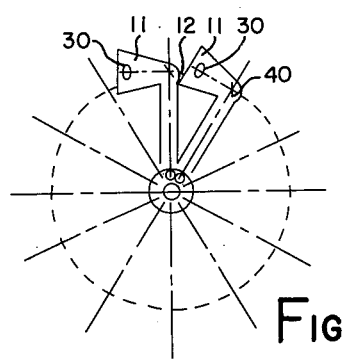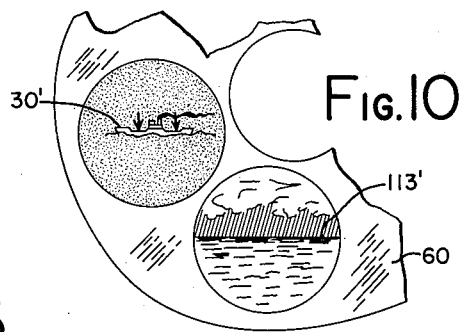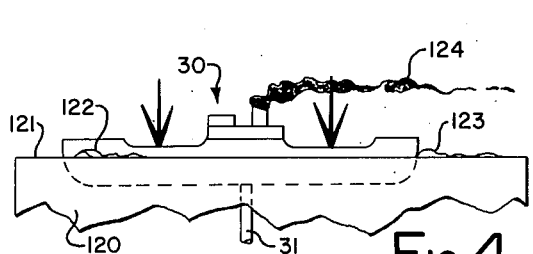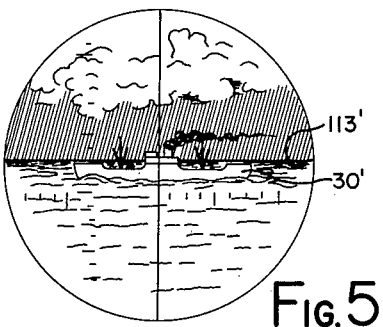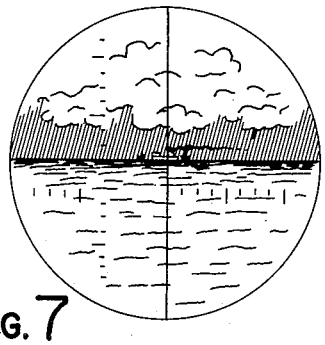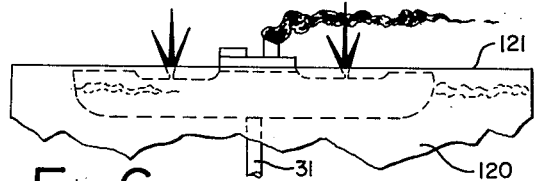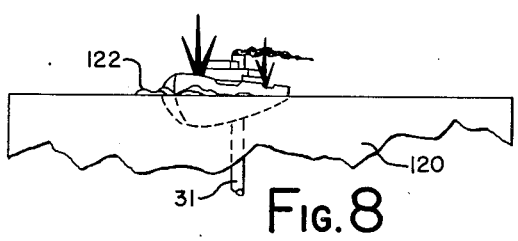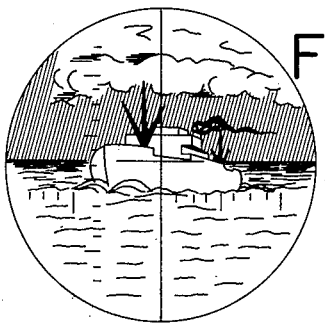

INVENTORS
J. DAVID BRYAN
JOHN W. THOMPSON
BY
THOMAS J. HOLDEN
ATTORNEY

United States Patent Office 3,039,204
Patented June 19, 1962

3,039,204
OPTICAL SIMULATOR
James David Bryan, 1545 Kennewick Road, Baltimore, Md., and John W. Thompson, Baltimore County, Md. (223 Burning Tree Road, Timonium, Md.)
Filed Dec. 2, 1959, Ser. No. 856,826
13 Claims. (Cl. 35—10.2)

This invention relates to optical simulators and, more particularly, to optical simulators for training observers in periscope target tracking.

The ship of an observer at sea is generally termed "own ship," and a ship viewed by the observer may be designated "target ship." The "true bearing" of a target is the angle between true north and the line of sight between target and own ship, and the "relative bearing" is the angle between the vector representing own ship course and the line of sight between target and own ship. When own ship is a submerged submarine, an observer using a periscope to obtain a view of the horizon surrounding his vessel may see multiple targets lying at various relative bearings and ranges. The position occupied by a given target in the field of view of the periscope is a function of the relative bearing of the target. The aspect of a given target, or its apparent heading relative to the observer, is a function of the "aspect angle" which is the angle between the vector representing target course and the line of sight between target and own ship. The size of a given target and the portion visible above the horizon are functions of target range.

In actual practice, an observer aboard a submarine must scan the ocean area encompassed by the periscope, select a target situated in such area, center periscope crosshairs on the target selected, and then determine relative bearing and range. The relative bearing of the target selected is determined by the angular position of the eyepiece box at which the reticle crosshairs are centered on the target. Generally, there is relative movement between own ship and target so that the observer is required to track the target. The training of observers in the art of periscope target tracking is facilitated by simulating ashore, the view seen through a periscope so that relative bearings and ranges determined by an observer as he tracks a target can be compared with actual relative bearings and ranges selected for the target by an instructor. As with all training systems, the effectivity of the training afforded is dependent upon the degree of realism achieved by the simulation process.

Conventional simulators merely scale down the view seen by an observer through a periscope. This is accomplished by providing a spherical surface representing the ocean and upon which servo driven model ships can travel in azimuth bearing and range relative to a periscope mounted in the center of the surface. Even with a scale factor of 1200:1, a room 60 feet by 60 feet is required to represent an area only 12 miles by 12 miles which is, of course, but the inner portion of the area actually seen by an observer. This means that the maximum range attainable by any target is 6 miles. A variation in magnification power of the telescope to reduce the image size of a target to the size commensurate with a range greater than 6 miles does not produce a realistic view for the observer because of the fact that the model cannot be made to move lower relative to the horizon as should occur due to the earth's curvature since the spherical surface of the simulator is fixed. In addition, a submarine submerging or surfacing before the eyes of an observer cannot be simulated for obvious reasons. Because of the above described limitations, the quality of realism achieved is poor and the choice of tactical problems that can be simulated is rather limited.

It would be desirable from a space standpoint to reduce the physical size of the simulator, and from a training standpoint to increase the degree of realism. The former requires a reduction in scale factor while the latter requires an increase in scale factor. Thus, the requirements are conflicting resulting in a compromise which causes simulators to be larger than desired so far as space availability is concerned and smaller than desired so far as quality of realism is concerned.

Those skilled in the art have expended a great deal of effort in an attempt to reduce the physical size of a simulator without reducing the quality of realism of the view seen through a training periscope, but so far as is known, the problems outlined above have remained unsolved. It is, therefore, an object of this invention to provide an optical simulator for training periscope operators in which the degree of realism attainable with the simulator is independent of its physical size.

As a feature of this invention whereby the objects thereof are achieved, a training periscope is provided with a rotatable eyepiece box. As with an operational periscope, the angular position of the eyepiece at which an image of the target is centered on the reticle pattern corresponds to the relative azimuth bearing of the target. Surrounding the periscope are a plurality of optical units, each of which contains: a ship model mounted for rotation about and translation parallel to its yaw axis; an optical system; and a rotatably mounted scanner. The optical units are constructed so that the yaw axes of the models are circumferentially arranged around and spatially fixed relative to the optical axis of the periscope. Thus, the targets are fixed in azimuth and range relative to the optical axis of the periscope. The optical axis of each scanner intersects its associated target about halfway between the waterline and top of the superstructure of the model. Each scanner has an operative angular position at which it directs light from its target into the field of view of its optical system. Each optical system directs light from its scanner into the periscope where the light is superimposed with light from the other optical systems and is viewable through the eyepiece. Rotation of all the scanners is synchronized with rotation of the eyepiece. As the eyepiece is rotated through 360°, each scanner is driven through its respective operative position. Each time a particular scanner is in its operative position, an image of its target appears at the eyepiece so that the particular target appears to an observer looking into the eyepiece to be at a certain relative azimuth bearing corresponding to the angular position occupied by the eyepiece. By providing for selective rotation of the particular scanner independently of the eyepiece, a selective change can occur in the angular position of the eyepiece at which the particular scanner is caused to be in its operative position. Hence, an image of the particular target can be made to appear at a different angular position of the eyepiece. To an observer looking through the eyepiece, this has the result of causing the particular target to appear to change in relative azimuth bearing despite the fact that the particular target actually remains spatially fixed in azimuth relative to the observer.

The angular position of a particular target on its yaw axis determines the aspect of the target as seen by an observer through the eyepiece. Therefore, means are provided for causing selective rotation of the target in order to achieve any given aspect angle. The size of the image of a particular target as seen by an observer through the eyepiece determines the apparent range of the target. The elevation of the image relative to an artificial horizon compensates for the effect of the curvature of the earth at the range of the particular target.

As a part of the optical system of each optical unit, a variable power optical device is provided for changing the target image size at the eyepiece. Means are provided for continuously varying each power optical device and for translating the associated target in order to achieve the illusion of target-ranging despite the fact that all the targets are actually spatially fixed in range relative to the observer.

With the above described apparatus, selective rotation of a particular scanner, selective rotation and translation of its associated target and continuous variation of the associated power device, causes an observer looking through the eyepiece to see an image which appears to be a target moving in relative azimuth bearing and changing in aspect and range according to a definite program. In this manner, a particular target can be made to appear at any relative azimuth bearing and execute any desired maneuver. Because the light from the plurality of optical units is superimposed at the eyepiece, a plurality of targets, each individually controlled as to range, course, speed and azimuth bearing, can be simulated with a high degree of realism.

This invention thus permits a target to remain fixed in both azimuth and range relative to an observer while creating the illusion through optical means of both 360° azimuth movement of the target about the observer and ranging of the target from close-up to disappearance over the horizon. In this manner, it can be seen that not only is the space requirement of this simulator smaller than that of previously known simulators, but the view afforded therewith so far as realism is concerned is significantly improved over that afforded by previously known simulators.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

Referring now to the drawings:

FIGURE 3 is a schematic of the spatial positions of the targets.

FIGURE 4 shows a model ship when the range is close.

FIGURE 5 is a view of the model shown in FIGURE 4 as seen through the periscope.

FIGURE 6 shows a model ship when the range is far.

FIGURE 7 is a view of the model shown in FIGURE 6 as seen through the periscope.

FIGURE 8 shows a model ship in a different aspect than that shown in FIGURE 4.

FIGURE 9 is a view of the model shown in FIGURE 8 as seen through the periscope.

FIGURE 10 shows a top view of a portion of the objective assembly of the periscope.

Figures 1, 2:
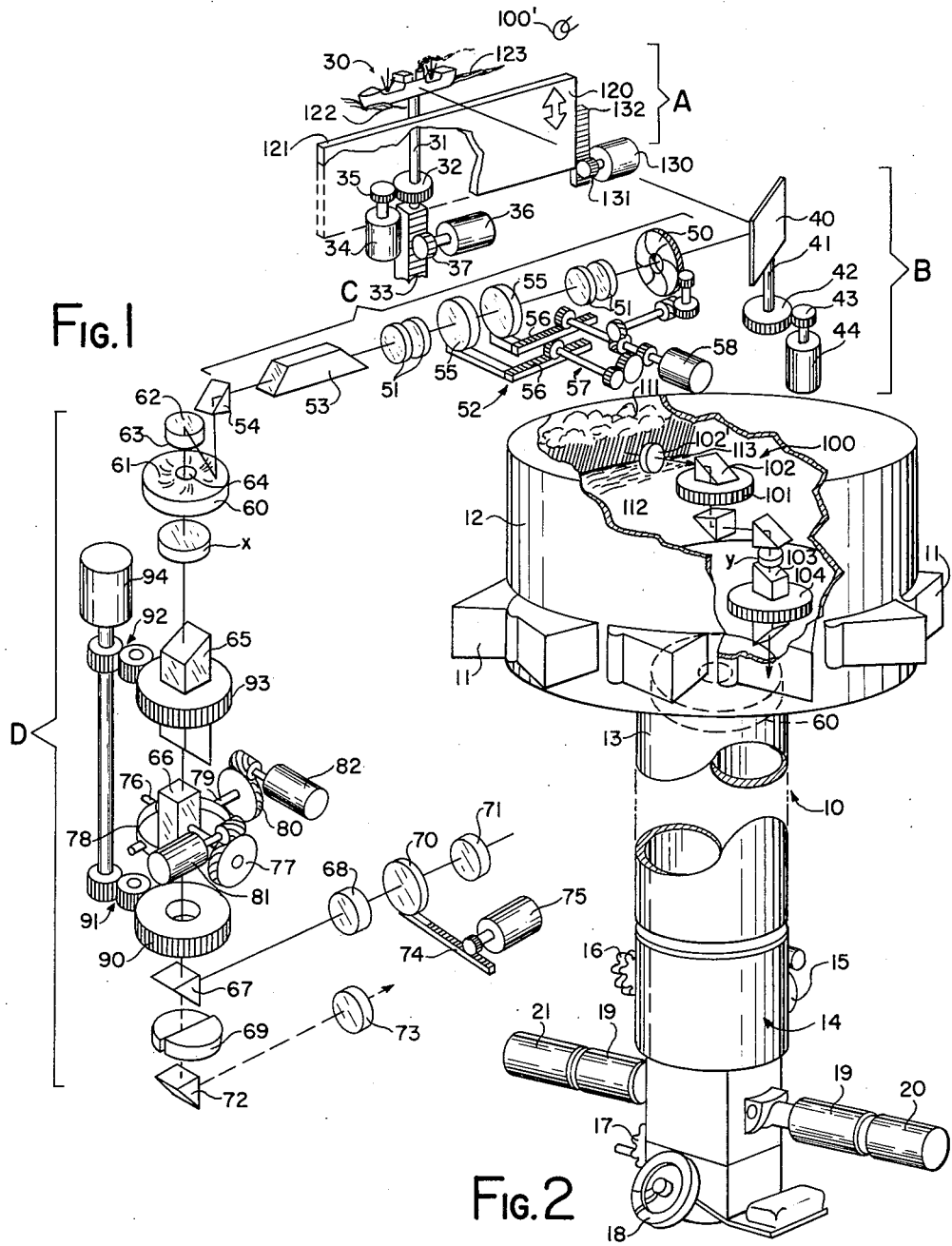
FIGURE 1 shows an assembled simulator.
FIGURE 2 shows the training periscope and a single target with other targets removed for clarity.
Figure 11:
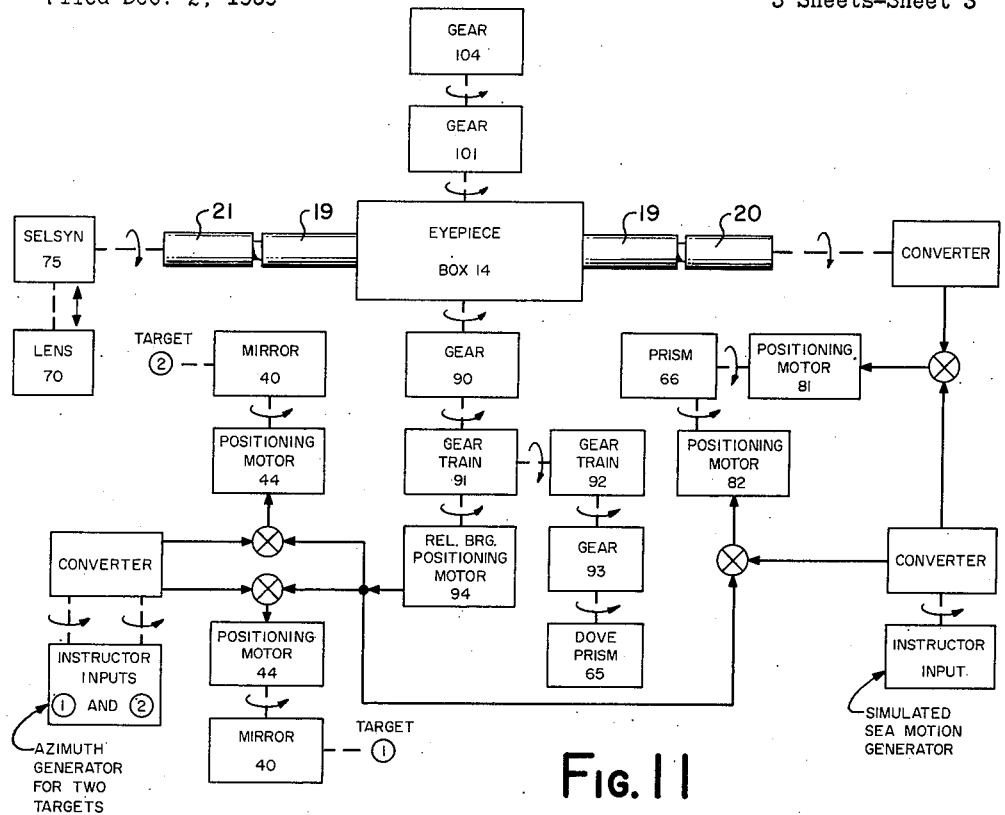
FIGURE 11 is a schematic showing the general mechanical and electrical connection between the various components shown at B and D in FIGURE 1.
Figure 12:
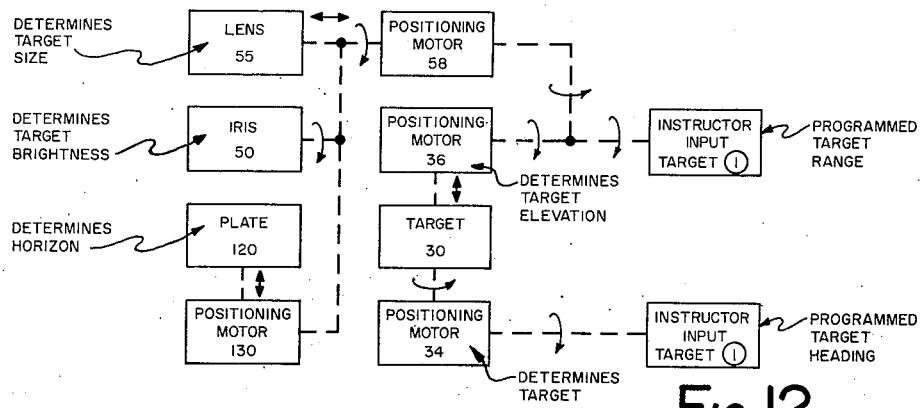
FIGURE 12 is a schematic showing the general mechanical and electrical connection between the various components shown at A and C in FIGURE 1.

Referring now to FIGURE 2, there is shown a simulator 10 made in accordance with this invention. Such simulator comprises a plurality of simulator units 11 spatially fixed around the periphery of cylindrical head 12, a vertical periscope tube 13 and a conventional periscope eyepiece box 14. Box 14 is rotatably mounted in tube 13. Mounted on box 14 is eyepiece 15, focusing knob 16, stadimeter operating knob 17 and stadimeter dials 18, together with training handles 19, altiscope grip 20 and power shift grip 21. The function of these components is well known to those skilled in the art and further explanation is therefore unnecessary to an understanding of this invention.

As shown in FIGURE 3, units 11 are made in the form of open-ended hollow chambers which are lightproof and extend radially around the axis of head 12. The drawing shows twelve optical units, but any number can be used depending upon the size of head 12. Since all the units are alike, only one will be described. Reference is now made to FIGURE 1 which shows a single unit associated with the periscope. Interior to the unit at A is target 30. While target 30 is shown to be a boat model suitably scaled, it should be understood that target 30 could be an island, an iceberg, or even an aircraft model. However, the following discussion particularly refers to a boat model for illustrative purposes. Target 30 is mounted on a vertical rod 31 to which gear 32 is attached. Rigidly attached to rod 31 is rack gear 33 which is suitably supported in bearings (not shown) so that target 30 is rotatable about and translatable parallel to its yaw axis. Target 30 is thus fixed in azimuth and range relative to the axis of rotation of eyepiece box 14. Target course positioning motor 34 drives gear 32 through pinion 35 to cause rotation of target 30 in response to external programmed signals from a central control source (not shown). Earth curvature compensator positioning motor 36 drives gear 37 to cause translation of target 30 in a prescribed manner related to a target range positioning motor to be described later.

Scanner device B may take the form of scanner mirror 40 mounted on rod 41 that is suitably journaled to provide for the rotation of mirror 40 about an axis that is parallel to but displaced from the axis about which target 30 is rotatable. Rigidly attached to rod 41 is gear 42 which meshes with gear 43 on relative azimuth bearing positioning motor 44. Positioning motor 44 is selectively operable by an instructor.

Optical system C may include adjustable iris 50, collimating lenses 51, variable power optical system 52, attitude dove prism 53 and right angle prism 54. System 52 may consist of lenses 55 which are each mounted on gear racks 56 such that relative movement of lenses 55 along the axis of optical system C can occur. Such movement produces an optical power change, or a change in magnification of the image. Movement of lens 55 and the interrelated opening of adjustable iris 50 are accomplished through gear train 57 as driven by range positioning motor 58.

The optical axis of periscope D is coincident with the axis of rotation of eyepiece box 14 and is at right angles to the optical axis of optical system C and parallel to the axes of rotation of target 30 and scanner mirror 40. The objective assembly of periscope D includes primary mirror 60 having an upwardly facing generally spherical reflecting surface 61, and secondary mirror 62 having a downwardly facing generally spherical reflecting surface 63. Secondary mirror 62 is placed above primary mirror 60 so that a beam of light which is downwardly directed and incident upon surface 61 is reflected upwardly towards secondary mirror 62 where it is reflected by surface 63 through hole 64 in the center of primary mirror 60. Thus, a bundle of light rays which are parallel to the optical axis of periscope D but offset therefrom will be directed downwardly toward surface 61, reflected upwardly therefrom toward the axis of the periscope and reflected by surface 63 into a path coincident with the optical axis through hole 64. An image plane is thus formed below primary mirror 60. Collimating lens *x* below mirror 60 is used to collimate the light. This arrangement is similar to a Cassegrainion reflecting mirror system. While the objective assembly shown uses reflective optics, it is obvious that refractive optics could be used to accomplish the same result.

After collimation, the light passes through rotatable dove prism 65 and then through seastate simulator prism 66 to prism 67 where the light is directed toward reticle 68. From reticle 68, the light passes through variable power eyepiece element 70 and then to main eyepiece lens 71. In order to read range, prism 67 may be shifted out of the optical path of the light leaving seastate prism 66. This permits the light to pass through split lens 69 and prism 72. The latter prism redirects the light into stadiscope eyepiece lens 73. Split lens 69 provides for realistic stadimeter ranging as in an operational periscope. Lens 70 may be attached to gear rack 74. When prism 67 is positioned to direct light into eyepiece lens 71, lens 70 can be moved into and out of operative position by the energization of selsyn 75 caused when power shift grip 21 is rotated. In this manner, the power of periscope D can be varied in the same manner as in an operational periscope.

Seastate simulator prism 66 is a plane-parallel plate mounted on shaft 76 to which worm gear 77 is rigidly attached. Shaft 76 is gimbaled by ring 78 and bearing shaft 79. Worm gear 80 is rigidly attached to shaft 79. Roll positioning motor 81 and pitch positioning motor 82 are selectively operable by an instructor to rotate prism 66 about orthogonal axes normal to the optical axis of the periscope. Thus, an image in eyepiece lens 71 (and stadimeter eyepiece lens 73) is caused to be displaced such that an observer experiences an apparent roll and pitch of his own ship. The reticle pattern of an operational periscope can be centered on a target despite actual roll and pitch of a submarine by providing a tiltable head prism (altiscope) which can be controlled by the officer using the periscope. With the above described arrangement, the altiscope feature of a periscope can be simulated. Thus, signals applied to positioning motors 81 and 82 by an instructor can be nullified by proper action of altiscope control 20. The rotation of eyepiece box 14 by an observer in order to scan the ocean means that eyepiece 15 rotates about the optical axis of the periscope. Such rotation of eyepiece 15 at a particular rate causes rotation of gear 90 at the same rate. Gear trains 91 and 92 cause gear 93 to counterrotate at twice the particular rate of eyepiece 15. Dove prism 65 is attached to gear 93 and is thus rotated at twice the particular rate of eyepiece 15 to maintain image orientation. Rotation of eyepiece 15 imparts rotation to relative bearing positioning motor 94 which is electrically connected with positioning motor 44 such that rotation of scanner mirror 40 is synchronized with rotation of eyepiece 15. However, an instructor may nevertheless operate positioning motor 44 and cause rotation of mirror 40 independently of its rotation caused when the observer rotates eyepiece 15. Stated otherwise, rotation of the eyepiece 15 through a particular angle causes rotation of scanner mirror 40 through the same particular angle and rotation of dove prism 65 through twice the particular angle.

Above units 11 is background optical system 100 shown best in FIGURE 2. Gear 101 is mounted for rotation about the optical axis of the periscope, and to this gear is attached background prism 102. Background dove prism 103 is mounted on gear 104 for rotation about an axis which is displaced from the periscope axis by an amount equal to the displacement of the vertical axis of prism 54 from the periscope axis. The rotation of gear 101 is synchronized with rotation of eyepiece 15, while gear 104 is counter-rotated at twice the speed of gear 101 to provide image orientation function for prism 103. The interior cylindrical surface of head 12 is provided with background 110 containing clouds 111 and seascape 112 separated by horizon 113. Such background may be in the form of a colored film strip that is replaceable to allow various weather conditions to be simulated.

Recalling that unit 11 is lightproof, target 30 interior must be illuminated by light source 100′, representing the sun-moon. By covering the interior of unit 11 with a light-absorbing material, the only light reflected toward scanner mirror 40 comes from target 30. Light from the target is directed into the field of view of optical system C only when scanner mirror 40 is within a certain angular region of its rotation. Such region may be termed the operative position of the scanner and is fixed by the geometry of the setup. Thus, when scanner mirror 40 is in its operative position, a bundle of rays from the target enters optical system C through the aperture in adjustable iris 50, and is collimated into a bundle of parallel rays by collimating lenses 51. Such bundle of parallel rays then passes through variable power lenses 55 and attitude prism 53 into right angular prism 54 which redirects the light into a bundle of parallel rays parallel to but spaced from the optical axis of the periscope. Since the optical axis of optical system C is normal to the axis of rotation of mirror 40, rotation of mirror 40 does not cause the image of target 30 in mirror 60 (see FIGURE 10) to rotate as it sweeps across the field of view and the target image 30′ thus remains erect. However, it is necessary to orient the image of target 30 so that at eyepiece 15 the target appears to be upright. Orientation of the image is achieved by adjusting dove prism 53 until the attitude of the target at eyepiece 15 is proper. Once this adjustment is made, dove prism 53 is held fixed. As previously described, mirror 62 redirects the light from the scanner mirror along the axis of the periscope, through collimator *x*, and into dove prism 65 and seastate prism 66 whenever the mirror is in its operative position. An observer looking into eyepiece 15 thus sees an image of target 30 as illuminated by source 100′.

Assume now that the interior of head 12 is illuminated by a point source representing the sun. Light from background 110 is collected by lens 102′ and redirected by prism 102 along the axis of rotation of the prism. Other prisms are used to redirect the light passing through prism 102 into collimating lens *y*. The light, however, is displaced from the optical axis of the periscope. Thus, an image of the background appears on mirror 60 as seen in FIGURE 10, the geometry of the setup being such that no prism 54 of any optical unit interferes with the light from collimating lens *y*. An angular position of prism 102 with respect to prism 103 is chosen such that the attitude of image horizon 113′ agrees with the attitude of target image 30′, and an image of the target is properly superimposed upon an image of the background at the eyepiece. To improve the contrast of the target image, it may be desirable to provide a darkened skyscape 111 immediately above horizon 113 and a darkened seascape 112 immediately below horizon 113.

The angular position of eyepiece 15 at which an observer sees the reticle pattern centered on an image of target 30 corresponds to the relative azimuth bearing of the target. However, because mirror 40 is movable independently of eyepiece lens 71, it is possible to cause the mirror to be positioned in its operative angular position (that is, the position at which the mirror directs light from the target into the optical system) regardless of the angular position of the eyepiece. Thus, in order to simulate a target at any given relative bearing, it is only necessary to cause the mirror to be in operative position whenever the eyepiece is in the particular angular position which corresponds to the given relative bearing. After an instructor selects a relative bearing for the target, the angular position of the eyepiece at which the target should appear is known. By selective operation of positioning motor 44, the instructor may cause the mirror to rotate independently of the eyepiece until the angular positions of mirror 40 and eyepiece 15 bear such definite relationship that an image of the target will appear at the eyepiece only when the eyepiece is in the angular position which corresponds to the relative bearing selected by the instructor. For each relative bearing at which the instructor desires the target to appear, there corresponds a definite relation between mirror angular position and eyepiece angular position. Thus, while the target is spatially fixed relative to the observer at some azimuth bearing, it is possible through the differential motion between the mirror and eyepiece, to cause the target to appear to the observer as being at any azimuth bearing.

Assuming that the eyepiece is in some angular position other than the position corresponding to the relative bearing of the target selected by the instructor, the only light entering the periscope comes from the background since the scanner mirror is not in its operative position. An observer looking through the eyepiece thus sees a sea/sky background which simulates the view seen through the periscope of a submarine. The observer scans the horizon by rotating the eyepiece. Such rotation causes synchronous rotation of prism 102 and mirror 40 and counter-rotation of dove prisms 103 and 66 at twice the rotation of the eyepiece. As a result, the observer sees the sea/sky background moving relative to the reticle pattern which simulates the view seen through the periscope of a submerged submarine when the horizon is scanned. When the eyepiece approaches the angular position which corresponds to the true bearing of the target selected by the instructor, mirror 40 approaches its operative position. Further rotation of the eyepiece causes an image of the target to be superimposed on the sea/sky background and an illusion is created of a ship at the selected relative bearing fixed at a given range and aspect angle.

In order to cause the target to appear to move in azimuth bearing, the instructor applies a selective differential movement to mirror 40 causing it to rotate independently of eyepiece 15. The observer is thus required to rotate the eyepiece in order to keep the reticle pattern centered on the target image. This rotation of the eyepiece to track the target as it moves in response to commands from the instructor is an important element in training the observer. It is important to realize that the differential motion able to be applied to the mirror at the instructor's command enables the target to appear to sail completely around the observer notwithstanding the fact that the target is actually fixed in azimuth bearing. Such differential motion effectively shifts the line of sight from the periscope axis to the target yaw axis through 360° without changing the aspect angle.

The aspect angle of the target is determined by the angular position of target 30 on shaft 31. Actuation of positioning motor 34 by the instructor causes target 30 to rotate about shaft 31. In this manner, the instructor can cause the target to appear to take any course desired relative to the observer.

The range of the target determines its image size as seen by the observer. However, in order to simulate the curvature of the earth, the elevation of the image of the target relative to the image horizon 113' must be varied as a function of range. At close range as well as at extreme range, the target image must lie below the image horizon, while at an intermediate range the target image must lie exactly on the horizon. Positioning motors 36 and 58 are operated together to interrelate target elevation, relative spacing of lenses 55 and the opening of iris 50. Iris 50 serves to maintain constant image brightness as the image size changes due to relative movement between lenses 55. The portion of target 30 above the waterline is painted with a light reflective material while the portion of the target below the waterline including shaft 31 is painted with a light absorbing material. Recalling that the skyscape and seascape background in the vicinity of horizon 113 of background 110 is made slightly darker than would normally be the case, there is sufficient contrast between the target image and the background image when the images are superimposed to make the target appear realistic. This is satisfactory when the target range is such that the image should be seen in front of the image horizon, since an observer would expect to see all of the target above the waterline. However, at extreme range, the ocean should obscure that portion of the target which is below the horizon. To accomplish this result with superimposed images, artificial horizon plate 120 is mounted between target 30 and mirror 40. At close and intermediate range, motor 130 driving pinion 131 operates rack 132 attached to plate 120, and moves the latter in elevation with target 30 so that top edge 121 of plate 120 is kept even with the waterline of target 30. This is illustrated in FIGURE 4. When the range selected by the instructor is less than the line of sight range of the periscope, positioning motors 36 and 58 are selectively actuated so that images of target 30 and plate 120 are superimposed upon the background image with the illuminated portion of the target positioned below image horizon 113'. Plate 120 is painted with a light absorbing material and the image reflected by mirror 60 into the periscope when mirror 40 is properly positioned is shown in FIGURE 10. Only the illuminated portion of the target is seen. At the eyepiece, the target image appears as shown in FIGURE 5.

When the range selected by the instructor is greater than the line of sight range of the periscope, positioning motors 36 and 58 are selectively actuated to properly position the target image relative to the image horizon and to make the image size proper for the range. In this case, edge 121 of plate 120 is moved so that it coincides with image horizon 113'. Thus, the waterline of target 30 lies below the level of edge 121 as shown in FIGURE 6, and plate 120 obscures all but that portion of the target projecting above edge 121. The view seen through the eyepiece is shown in FIGURE 7. It should be understood that positioning motor 36 which controls the target elevation as a function of range, positioning motor 58 which controls lens 55 and iris 50 to control target size and brightness as a function of range, and positioning motor 130 which controls the amount of the target visible to an observer as a function of range, are all programmed and controlled by an instructor to achieve an image of the target that has the correct relative size, brightness, and elevation relative to the horizon for the selected range.

Reference is now made to FIGURE 8 which is the view seen by mirror 40 after the instructor has rotated the target about its yaw axis to simulate a change in aspect angle. The view seen by the observer is shown in FIGURE 9. Comparing FIGURE 9 with FIGURE 5, the observer would view a target executing a turning maneuver as a result of rotation of the target by the instuctor. A simultaneous change in the spacing of lenses 55 would create the illusion that the target is closing on the observer.

In order to add realism to the observer's view, bow waves 122 and stern wave 123 are attached to the model. Such waves, which may be rigid white plastic material, stream out from the model in the same manner that actual waves stream out from a real ship. Smoke 124 may be added if desired for further realism.

With the above described apparatus, an instructor may cause the target to appear at any desired relative bearing by properly adjusting mirror 40 relative to eyepiece lens 71. Thereafter, by a programmed actuation of positioning motor 44, the angular position of the eyepiece at which the target image can be centered on the reticle pattern changes to simulate a target moving in azimuth bearing. Programmed actuation of positioning motor 34 causes rotation of target 30 about its yaw axis to cause a change in the aspect angle of the target image. Programmed actuation of positioning motors 36 and 58, together with movement of plate 120, causes variation in the image size of the target and its elevation relative to the image horizon to simulate a target changing range. In this manner, an instructor can cause target 30 to appear to the observer to execute any maneuver at any place in the field of view of the periscope despite the fact that target 30 is actually fixed in azimuth and range relative to the observer.

The superposition principle employed to create the illusion of a target sailing on the ocean allows many targets to be simulated, each of which is individually controlled as to relative bearing, aspect angle, and range. Recalling that a plurality of optical units are mounted around rotatable eyepiece box 14, it should be evident that proper positioning of the scanner mirror of each unit relative to the one eyepiece will cause each target to appear at its proper relative bearing. Thus, an observer holding the eyepiece box fixed to study a fixed expanse of ocean could see many targets at any range selected by the instructor. Movement of the targets in azimuth bearing, aspect angle and range is controlled by adjusting the individual scanner mirrors, target course positioning motors, earth curvature compensator positioning motors, and range positioning motors.

When it is desired to use less than all the targets in a given problem, the unwanted targets can be gated from view by either extinguishing the proper sources of target illumination or moving the proper scanners out of operative position and then disconnecting them from the eyepiece. However, the extra targets can also be eliminated from view by completely withdrawing the same behind their respective horizon plates. This later flexibility permits a target to be a submarine model since it will appear to an observer that the target surfaces and submerges as the instructor causes the model to move above and below the top edge of the horizon plate.

Those skilled in the art will now appreciate that through the novel optical means disclosed herein, an instructor can cause a plurality of targets spatially fixed in range and azimuth relative to the observer to appear to the observer at any range and any azimuth. Moreover, the apparent position, range and aspect of any target can be controlled independently of the position, range and aspect of any other target. By using a colored background and realistically colored model ships, an observer sees an extremely realistic view at the periscope.

What is claimed is:

1. A simulator for training periscope operators comprising: a plurality of spaced targets; a periscope having a rotatable eyepiece; a rotatably mounted scanner associated with each target, each scanner having a certain angular position at which it directs light from its target into the periscope; means to direct the light from the scanners into the eyepiece; means interconnecting the eyepiece and each of the scanners so that rotation of the eyepiece causes rotation of all of the scanners, the eyepiece having a certain angular position for each scanner when the latter is in its certain angular position, rotation of said eyepiece through its certain angular positions causing rotation of each of said scanners through their certain angular positions so that an image of each target is swept across the field of view of an operator looking through the eyepiece and the targets appear fixed at given ranges and azimuth bearings; and means to selectively rotate the scanners independently of each other and of the eyepiece, selective rotation of the scanners causing the targets associated therewith to appear to an operator looking through the eyepiece to change their azimuth bearings with respect to the operator.

2. A simulator for training periscope operators comprising: a plurality of spaced targets; a periscope having rotatable optical means; a rotatably mounted scanner associated with each target, each scanner having a certain angular position at which it directs light from its target into the periscope; means on the periscope to direct light from all the scanners into said optical means; and means interconnecting said optical means with the scanners so that the latter rotate in synchronism with said optical means, said optical means having a certain angular position for each scanner when the latter is in its certain angular position.

3. A simulator for training periscope operators comprising: a target ship mounted for rotation about and translation parallel to its yaw axis; a periscope having a rotatable eyepiece; a rotatably mounted scanner for directing light from the target to the periscope when the scanner is in a certain angular position; an artificial horizon interposed between the target and the scanner; means interconnecting the eyepiece and the scanner so that rotation of the scanner is responsive to rotation of the eyepiece, said scanner being in its certain angular position when the eyepiece is in a first angular position, rotation of said eyepiece through its first angular position causing rotation of the scanner through its certain angular position whereby an image of the target and the artificial horizon is swept across the field of view of an operator looking through the eyepiece and the target appears to be a ship on the horizon fixed at a given range, course and azimuth bearing with respect to the operator; a continuously variable power system optically connected with the periscope for continuously changing the size of the target on the horizon as seen through the eyepiece; means to selectively rotate the scanner independently of the eyepiece; means to selectively rotate said target; and means to selectively translate the target relative to the horizon; selective rotation of the scanner and target when the eyepiece remains at its first angular posiion causing the target to appear to an operator looking through the eyepiece to move in azimuth bearing and change course with respect to the operator, and continuous variation of the variable power system causing the target to appear to change in range as the size of the target and its elevation relative to the horizon changes.

4. A simulator in accordance with claim 3 wherein means are provided for superimposing upon the field of view seen through the eyepiece, a background of artificial sky and groundscape that are separated by an horizon so that the background is superimposed upon the image of the target and artificial horizon when the eyepiece is at its first angular position, the artificial horizon coinciding with the background horizon.

5. A simulator for training a periscope operator comprising: a target mounted for rotation about and translation parallel to its yaw axis; a periscope having a rotatable eyepiece; a rotatably mounted scanner for directing light from the target to the periscope when the scanner is in a certain angular position; an artificial horizon; means for directing light from the artificial horizon into the periscope; means interconnecting the eyepiece and the scanner so that rotation of the scanner is responsive to rotation of the eyepiece, said scanner being in its certain angular position when the eyepiece is in a first angular position, rotation of said eyepiece through its first angular position causing rotation of the scanner through its certain angular position whereby an image of the target and the artificial horizon is swept across the field of view of an operator looking through the eyepiece and the target appears to be a target on the horizon fixed at a given range, course and azimuth bearing with respect to the operator; a continuously variable power system optically connected with the periscope for continuously changing the size of the target on the horizon as seen through the eyepiece; means to selectively rotate the scanner independently of the eyepiece; means to selectively rotate said target; and means to selectively translate the target relative to the horizon for changing its elevation with respect thereto, selective rotation of the scanner and target when the eyepiece remains at its first angular position causing the target to appear to an operator looking through the eyepiece to move in azimuth bearing and change course with respect to the operator; and continuous variation of the variable power system and selective translation of the target causing the target to appear to change in range as the size of the target and its elevation relative to the horizon changes.

6. A simulator for training periscope operators comprising: a plurality of spaced targets, each mounted for rotation about an axis, the axes of rotation defining a cylinder; a periscope having an optical path aligned with the axis of the cylinder, optical means rotatable on the periscope about said optical path; a rotatably mounted scanner associated with each target, each scanner having a certain angular position at which it directs light from the target associated with the particular scanner toward the axis of the cylinder; means for directing the light from the scanners into paths defining a cylinder surrounding said optical path; means to superimpose the light from the scanners upon said optical means; and means interconnecting said optical means with each of said scanners so that the latter rotate in synchronism with the former, said optical means having a certain angular position for each scanner when the latter is in its certain angular position.

7. A simulator in accordance with that defined in claim 6 wherein means are provided for selectively rotating the scanners independently of each other and independently of said optical means.

8. A simulator for training periscope operators comprising: a target mounted for rotation about and translation parallel to an axis; an artificial background having an horizon; a periscope having rotatable optical means; means for directing light from the background into said optical means so that rotation of said optical means causes an image of the background to be swept past the field of view of the optical means in synchronism with such rotation whereby scanning of the background is simulated; a rotatably mounted scanner for directing light from the target into the periscope when the scanner is in a certain angular position; means in the periscope for directing light from the scanner into the field of view of the optical means so that an image of the target is superimposed upon an image of the background when said scanner is in its certain angular position; means interconnecting the optical means with the scanner so that the latter rotates in synchronism with the optical means, said scanner being in its certain angular position when the optical means is in a first angular position, rotation of said optical means through its first angular position causing rotation of said scanner through its certain angular position whereby scanning of a target fixed at a given range and azimuth bearing against a background is simulated; means for selectively rotating the scanner independently of said optical means; means for selectively rotating and translating said target; and continuously variable power means optically connected with said optical means for changing the image size seen by the optical means; selective rotation of the target and scanner, selective translation of the target and continuous variation of the variable power means when the optical means remains at its first angular position causing the target image to simultaneously rotate and move across the field of view of the optical means while moving relative to the horizon and changing in size thereby simulating against a background, a target changing course, azimuth bearing and range.

9. The combination with a dove prism having an axis of rotation, of a plurality of optical units, each unit comprising: a target; an optical system; and a rotatably mounted scanner for directing light from the target across the field of view of the optical system whenever the scanner rotates between certain angular positions; said optical system including optical means for directing the light from the scanner when it is rotated within said certain angular positions into a bundle of parallel rays which orient an image of the target in a certain attitude regardless of rotation of said scanner; said target units being mounted so that the bundles of rays from the optical systems produce images of each target that would lie in a circle whose center is the axis of rotation of the dove prism; the optical means of said optical system being arranged so that the images of all the targets are oriented in the same attitude around the axis of the dove prism; and means for directing the bundles of rays from the optical system through said dove prism along its axis of rotation.

10. A simulator for training periscope operators, comprising: a plurality of spaced targets spatially fixed in azimuth bearing relative to an optical axis; a scanner associated with each target, each scanner being rotatable about an axis parallel to said optical axis, each scanner directing light from its associated target toward said optical axis when the scanner is in a certain angular position; means to direct light from all the scanners along said optical axis; an eyepiece through which light directed along said optical axis can be viewed by an operator, said eyepiece being rotatable about said optical axis; and means interconnecting said eyepiece with each of said scanners so that rotation of said eyepiece through a given angle rotates each scanner through the same angle for causing the scanners to move in synchronism with said eyepiece whereby each target has an apparent azimuth relative to said optical axis determined by the angular position of the eyepiece at which the scanner associated with the last-mentioned target is in its certain angular position.

11. A simulator in accordance with claim 10 including means to selectively rotate said scanners independently of rotation of said eyepiece for causing the targets to change their apparent azimuths.

12. A simulator for training periscope operators, comprising: a sea/sky panorama having an horizon; means to direct light from said panorama along an optical axis; a periscope eyepiece through which light directed along said optical axis can be viewed by an operator whereby the operator sees the panorama with the horizon appearing to be at a predetermined range from said optical axis, said eyepiece being rotatable about said optical axis whereby an operator scans said horizon when he rotates the eyepiece about said optical axis; a target spatially fixed in azimuth bearing relative to said optical axis, said target being translatable on an axis parallel to said optical axis; a target scanner rotatably mounted on an axis parallel to said optical axis, said scanner directing light from the target toward said optical axis when the scanner is in a certain angular position; means to direct light from said scanner along said optical axis whereby an operator sees through the eyepiece the target superimposed on the panorama; means interconnecting said eyepiece with said scanner so that rotation of said eyepiece through a given angle rotates said scanner through the same angle for causing said scanner to move in synchronism with said eyepiece, rotation of said eyepiece about said optical axis causing the target to appear on the panorama at an apparent azimuth relative to said optical axis determined by the angular position of the eyepiece which positions the scanner in its certain angular position; optical means operable to selectively change the size of the image of the target on the panorama as seen through the eyepiece for simulating a target selectively changing range; and positioning means responsive to operation of said optical means for translating said target whereby the image position of the target moves upwardly toward the horizon as the image size of the target decreases, the image position being on the horizon when the range is said predetermined range.

13. A simulator in accordance with claim 12 including an opaque horizon plate positioned between said target and said scanner, said plate having an edge so that only that portion of the target above said edge can be seen through the eyepiece when said scanner is in said certain position; said plate being translatable on an axis parallel to said optical axis; means responsive to operation of said optical means for translating said plate in synchronism with said target until said target appears on the horizon at which time said edge is coincident with said horizon, said plate remaining fixed as further operation of said optical means decreases the image size, said positioning means being responsive to such further operation of said optical means for translating said target whereby the image position of the target moves downwardly away from the horizon and the target image appears to recede over the horizon.

References Cited in the file of this patent

UNITED STATES PATENTS

| | | |
|---|---|---|
| 2,536,718 | Brandon | Jan. 2, 1951 |
| 2,591,752 | Wicklund | Apr. 8, 1952 |
| 2,694,869 | McNatt | Nov. 23, 1954 |